(12) United States Patent
Bassit et al.

(10) Patent No.: US 10,973,236 B2
(45) Date of Patent: Apr. 13, 2021

(54) AUTOMATIC MEAT SEASONING APPARATUS

(71) Applicants: Deonarine Bassit, Parma, OH (US); Leela Ramphal, Parma, OH (US)

(72) Inventors: Deonarine Bassit, Parma, OH (US); Leela Ramphal, Parma, OH (US)

( * ) Notice: Subject to any disclaimer, the term of this patent is extended or adjusted under 35 U.S.C. 154(b) by 405 days.

(21) Appl. No.: 16/124,251

(22) Filed: Sep. 7, 2018

(65) Prior Publication Data

US 2020/0077669 A1   Mar. 12, 2020

(51) Int. Cl.
*A22C 17/00* (2006.01)
*A23L 13/70* (2016.01)
*A22C 9/00* (2006.01)

(52) U.S. Cl.
CPC .............. *A22C 17/00* (2013.01); *A22C 9/008* (2013.01); *A23L 13/72* (2016.08); *A23V 2002/00* (2013.01)

(58) Field of Classification Search
CPC ......... A22C 17/00; A22C 9/008; A23L 13/72; A23V 2002/00; A47J 37/041; A47J 37/04; A47J 37/042; A47J 37/0623; A47J 37/0664; A47J 37/0745; A47J 37/043; A47J 37/0629; A47J 37/0641; A47J 36/06; A47J 37/047; A47J 37/049
USPC ....... 99/486, 421 H; 126/25 R; 219/403, 411
See application file for complete search history.

(56) References Cited

U.S. PATENT DOCUMENTS

| | | | | | |
|---|---|---|---|---|---|
| 1,541,472 | A | * | 6/1925 | Born ..................... | A47J 37/047 99/327 |
| 1,976,989 | A | * | 10/1934 | Grimes ................. | A47J 37/041 99/346 |
| 2,470,645 | A | * | 5/1949 | Reichart ............... | A47J 37/041 99/421 H |
| 2,705,450 | A | * | 4/1955 | Steinbook ............. | A47J 37/047 99/340 |
| 2,729,160 | A | * | 1/1956 | Pirz ...................... | A47J 37/041 99/421 HV |
| 2,839,989 | A | * | 6/1958 | Persinger .............. | A47J 37/049 99/421 R |
| 2,882,812 | A | * | 4/1959 | Greenwald ........... | A47J 37/049 99/427 |
| 2,940,380 | A | * | 6/1960 | Rampel ................ | A47J 37/047 99/346 |

(Continued)

FOREIGN PATENT DOCUMENTS

| | | | | |
|---|---|---|---|---|
| EP | 0140237 A2 | * | 5/1985 | ............ A47J 37/047 |
| EP | 0300306 A2 | * | 1/1989 | .......... A47J 37/1214 |

(Continued)

*Primary Examiner* — Jimmy Chou

(57) ABSTRACT

An automatic meat seasoning apparatus for seasoning and tenderizing meat includes a housing having a housing aperture extending through to a cavity. A housing door is coupled to the housing to seal and unseal the housing aperture. A cylindrical drum is coupled to a pair of axles such that the drum is and rotatably coupled within the cavity. The drum has a drum aperture and a plurality of circular seasoning apertures. A drum door is coupled to the drum to close and open the drum aperture. A plurality of spikes is coupled inside the drum to gouge and tenderize a piece of meat placed inside the drum. A motor is coupled through the housing to rotate the drum. A control unit is coupled to the housing to operate the motor.

6 Claims, 4 Drawing Sheets

(56) References Cited

U.S. PATENT DOCUMENTS

| | | | | |
|---|---|---|---|---|
| 3,121,386 A * | 2/1964 | Persinger | A47J 37/0704 | 99/443 R |
| 3,126,814 A * | 3/1964 | Brown | A47J 37/041 | 99/421 H |
| D199,712 S * | 12/1964 | Elliott | D7/409 | |
| 3,196,776 A * | 7/1965 | Norton | A47J 37/042 | 99/421 P |
| 3,238,560 A * | 3/1966 | Jurisich | A22C 29/046 | 452/13 |
| 3,329,082 A * | 7/1967 | Satkunas | A47J 37/041 | 99/421 R |
| 3,980,010 A * | 9/1976 | Collinucci | A47J 37/00 | 99/421 H |
| 4,012,808 A * | 3/1977 | Strong | A23B 4/021 | 426/442 |
| 4,555,986 A * | 12/1985 | Eisenberg | A47J 37/049 | 99/427 |
| 4,663,517 A * | 5/1987 | Huff | A47J 37/0709 | 219/404 |
| 4,715,273 A * | 12/1987 | Riesselmann | A47J 37/041 | 219/523 |
| 5,134,927 A * | 8/1992 | McCarthy, III | A47J 37/047 | 126/21 A |
| 5,410,950 A * | 5/1995 | Rone | A47J 37/041 | 126/25 AA |
| 5,497,697 A * | 3/1996 | Promny | A47J 37/047 | 99/394 |
| 5,632,098 A * | 5/1997 | Finch | A23N 12/10 | 34/63 |
| 5,771,600 A * | 6/1998 | Romanow | A23N 12/10 | 34/63 |
| 5,970,854 A * | 10/1999 | Tsai | A47J 37/042 | 99/419 |
| D422,172 S * | 4/2000 | Hsu | D7/337 | |
| 6,079,319 A * | 6/2000 | Doria | A47J 37/047 | 99/331 |
| 6,079,322 A * | 6/2000 | Su | A47J 37/042 | 99/419 |
| 6,131,505 A * | 10/2000 | Lin | A47J 37/041 | 403/386 |
| 6,142,064 A * | 11/2000 | Backus | A47J 37/041 | 126/190 |
| 6,347,577 B1 * | 2/2002 | Harneit | A47J 37/047 | 99/419 |
| 6,393,972 B1 * | 5/2002 | Backus | A47J 37/041 | 99/421 HV |
| 6,408,742 B1 * | 6/2002 | Backus | A47J 37/041 | 99/419 |
| 6,437,291 B1 * | 8/2002 | Hopponen | A47J 37/042 | 219/386 |
| 6,497,175 B2 * | 12/2002 | Behm | A23N 12/10 | 99/419 |
| 6,561,083 B2 * | 5/2003 | Hsu | A47J 37/041 | 99/421 H |
| 6,634,281 B1 * | 10/2003 | Conigliaro | A47J 37/041 | 99/419 |
| 6,658,991 B2 * | 12/2003 | Backus | A47J 37/041 | 99/395 |
| 6,965,095 B1 * | 11/2005 | Popeil | A47J 37/042 | 219/403 |
| 6,988,445 B1 * | 1/2006 | Backus | A47J 37/042 | 99/421 H |
| 7,021,203 B2 * | 4/2006 | Backus | A47J 37/041 | 99/421 H |
| 7,021,204 B2 * | 4/2006 | Backus | A47J 37/041 | 99/339 |
| 7,225,730 B2 * | 6/2007 | Backus | A47J 37/042 | 99/419 |
| 7,478,586 B2 * | 1/2009 | Gabrielle | A47J 37/042 | 99/340 |
| 7,514,651 B2 * | 4/2009 | Popeil | A47J 37/042 | 219/392 |
| 7,626,142 B2 * | 12/2009 | Backus | A47J 37/041 | 219/403 |
| 7,878,111 B2 * | 2/2011 | Backus | A47J 37/041 | 99/421 H |
| 7,921,768 B2 * | 4/2011 | Fernandez | A47J 37/042 | 99/419 |
| D650,228 S * | 12/2011 | Gardner | D7/409 | |
| 8,677,891 B2 * | 3/2014 | Stier | A47J 37/0731 | 99/421 R |
| D771,994 S * | 11/2016 | Zemel | D7/338 | |
| D783,337 S * | 4/2017 | Markussen | D7/354 | |
| D863,884 S * | 10/2019 | Prior | D7/409 | |
| 10,485,377 B2 * | 11/2019 | Glucksman | A47J 37/0658 | |
| 2002/0108502 A1 * | 8/2002 | Kim | A47J 37/0709 | 99/419 |
| 2003/0047552 A1 * | 3/2003 | Hsu | A47J 37/041 | 219/400 |
| 2003/0222073 A1 * | 12/2003 | Moon | A47J 37/0641 | 219/404 |
| 2005/0056633 A1 * | 3/2005 | Backus | A47J 37/041 | 219/392 |
| 2006/0112837 A1 * | 6/2006 | Gabrielle | A47J 37/042 | 99/419 |
| 2006/0225580 A1 * | 10/2006 | Fernandez | A47J 37/042 | 99/419 |
| 2006/0278211 A1 * | 12/2006 | Powell | A47J 37/041 | 126/30 |
| 2008/0229937 A1 * | 9/2008 | Stephen | A47J 37/07 | 99/421 R |
| 2009/0000493 A1 * | 1/2009 | Mosher, II | A47J 37/0623 | 99/421 R |
| 2009/0071462 A1 * | 3/2009 | Liu | A47J 37/041 | 126/25 R |
| 2011/0097468 A1 * | 4/2011 | Driscoll | A47J 37/0786 | 426/519 |
| 2011/0209627 A1 * | 9/2011 | Wong | A47J 43/18 | 99/419 |
| 2012/0037012 A1 * | 2/2012 | Stier | A47J 37/0704 | 99/421 H |
| 2012/0204732 A1 * | 8/2012 | Dondurur | A47J 37/041 | 99/427 |
| 2012/0255537 A1 * | 10/2012 | Kanwar | A47J 37/0745 | 126/25 AA |
| 2013/0104745 A1 * | 5/2013 | Stier | A47J 37/0731 | 99/421 R |
| 2013/0112087 A1 * | 5/2013 | Hassell | A47J 43/18 | 99/421 H |
| 2013/0112088 A1 * | 5/2013 | May | A47J 37/07 | 99/421 H |
| 2013/0233182 A1 * | 9/2013 | Hunt | A47J 37/0629 | 99/341 |
| 2014/0216271 A1 * | 8/2014 | Arling | A47J 37/041 | 99/421 H |
| 2014/0261015 A1 * | 9/2014 | Nelson | A23B 4/0523 | 99/467 |
| 2016/0309956 A1 * | 10/2016 | Glucksman | A47J 37/047 | |
| 2019/0014944 A1 * | 1/2019 | Huang | F24C 15/164 | |
| 2020/0029731 A1 * | 1/2020 | Hunt | A47J 37/042 | |
| 2020/0093329 A1 * | 3/2020 | Glucksman | A47J 37/041 | |

FOREIGN PATENT DOCUMENTS

| | | | |
|---|---|---|---|
| EP | 1994864 A1 * | 11/2008 | A47J 37/047 |
| FR | 2645716 A1 * | 10/1990 | A47J 37/047 |

* cited by examiner

AUTOMATIC MEAT SEASONING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to meat seasoning devices and more particularly pertains to a new meat seasoning device for seasoning and tenderizing meat.

BRIEF SUMMARY OF THE INVENTION

An embodiment of the disclosure meets the needs presented above by generally comprising a housing having a right face, a left face, a front, a rear, a top, a bottom, and a cavity. The housing has a housing aperture extending through to the cavity from the front to the top and from proximal the right face to proximal the left face. A housing door is swingably coupled to the housing with a first hinge coupled to an upper edge of the housing aperture. The housing door has an open position and an alternate closed position sealing the housing aperture. A handle is coupled to the housing door. A pair of axles comprises a free axle centrally coupled to the right face of the housing within the cavity and a drive axle centrally coupled to the left face of the housing within the cavity. A cylindrical drum is coupled to the pair of axles such that the drum is coaxially and rotatably coupled within the cavity. The drum has a right wall, a left wall, a body wall, and an inside with the right wall coupled to the free axle and the left wall coupled to the drive axle. The drum has a drum aperture extending through the body wall to the inside from the right face to proximal the left face and a plurality of circular seasoning apertures extending through each of the right wall, the left wall, and the body wall. The plurality of seasoning apertures is configured to allow for a plurality of seasonings placed in the housing to move freely between the housing and the drum. A drum door is swingably coupled to the drum with a second hinge coupled to an upper perimeter of the drum aperture. The drum door has a load position and an alternate operate position closing the drum aperture. The drum door has a second plurality of seasoning apertures. A plurality of spikes is coupled to the right wall and the left wall inside the drum and is configured to gouge and tenderize a piece of meat placed inside the drum. A motor is coupled to the left face of the housing. The motor has a motor drive coupled through the housing to the drive axle to rotate the drive axle and thus rotate the drum within the housing. A control unit is coupled to the housing and has a plurality of controls. The control unit is in operational communication with the motor. A power cord is coupled to the motor to provide power.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
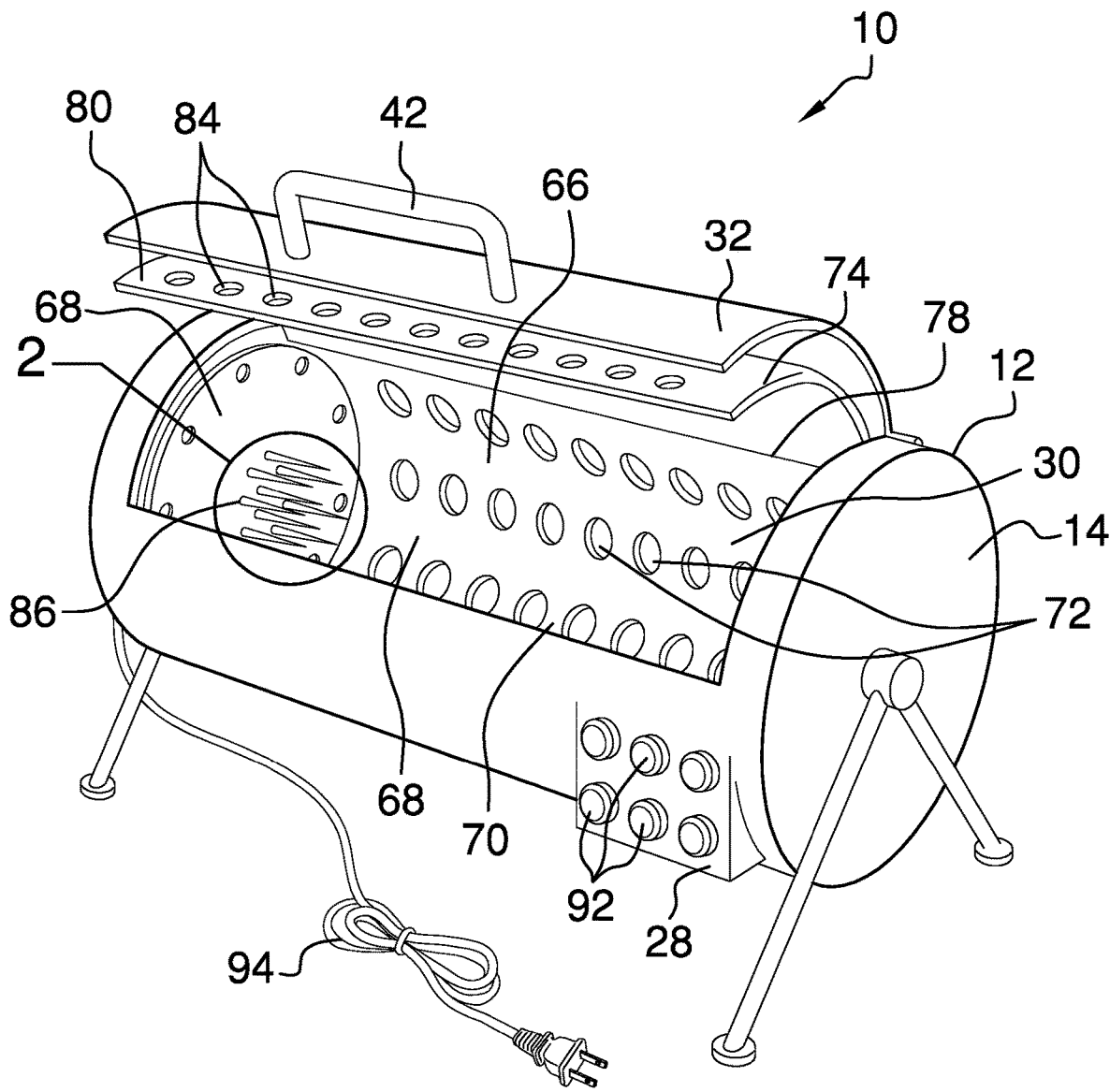
FIG. 1 is an isometric view of an automatic meat seasoning apparatus according to an embodiment of the disclosure.
Figure 2:
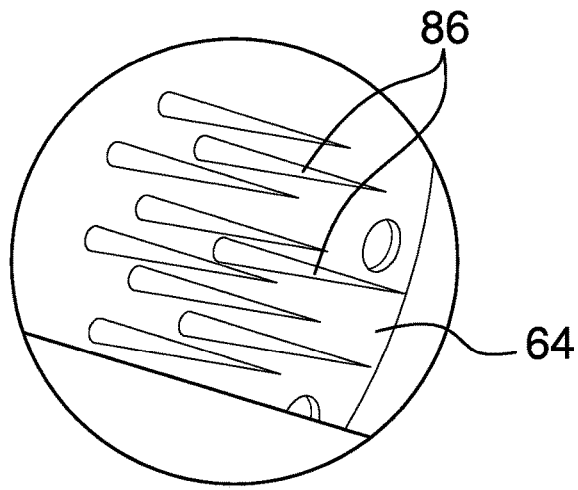
FIG. 2 is a detail view of an embodiment of the disclosure.
Figure 3:
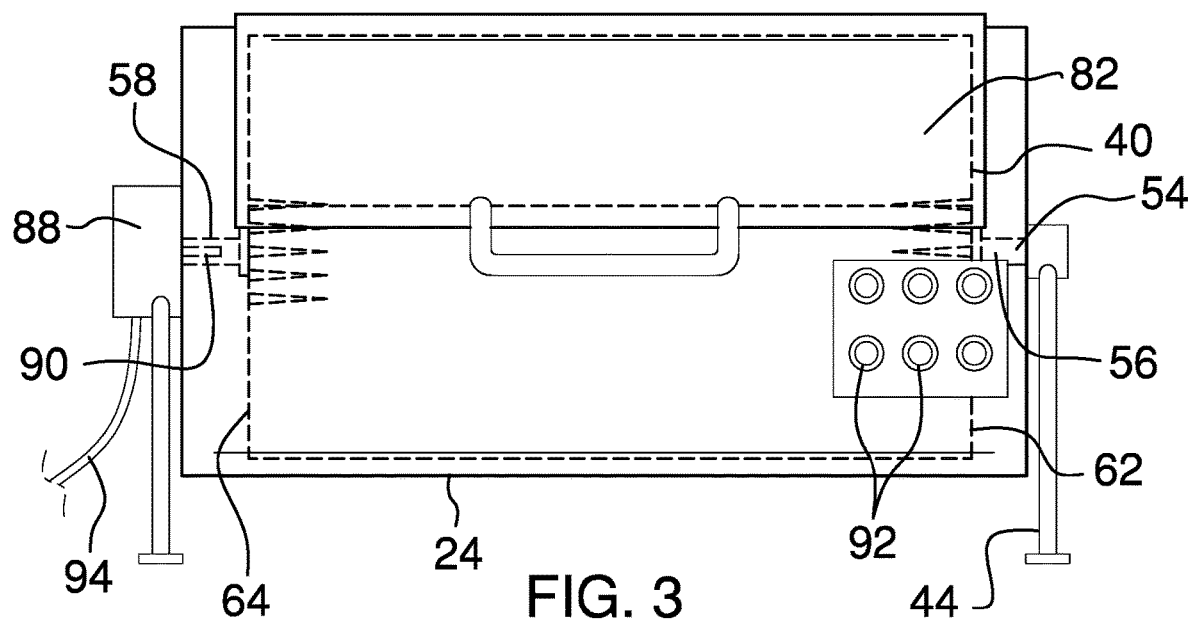
FIG. 3 is a front elevation view of an embodiment of the disclosure.
Figure 4:
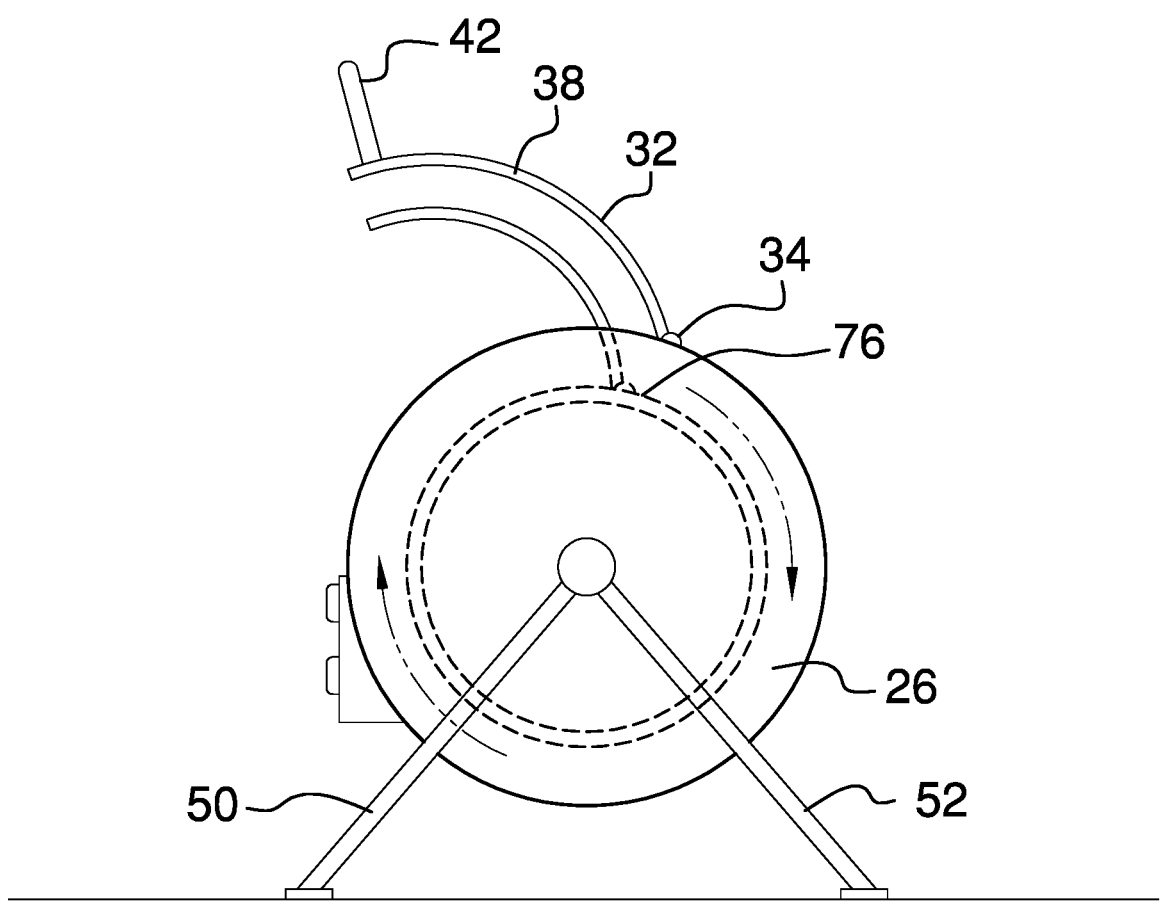
FIG. 4 is a side elevation view of an embodiment of the disclosure.
Figure 5:
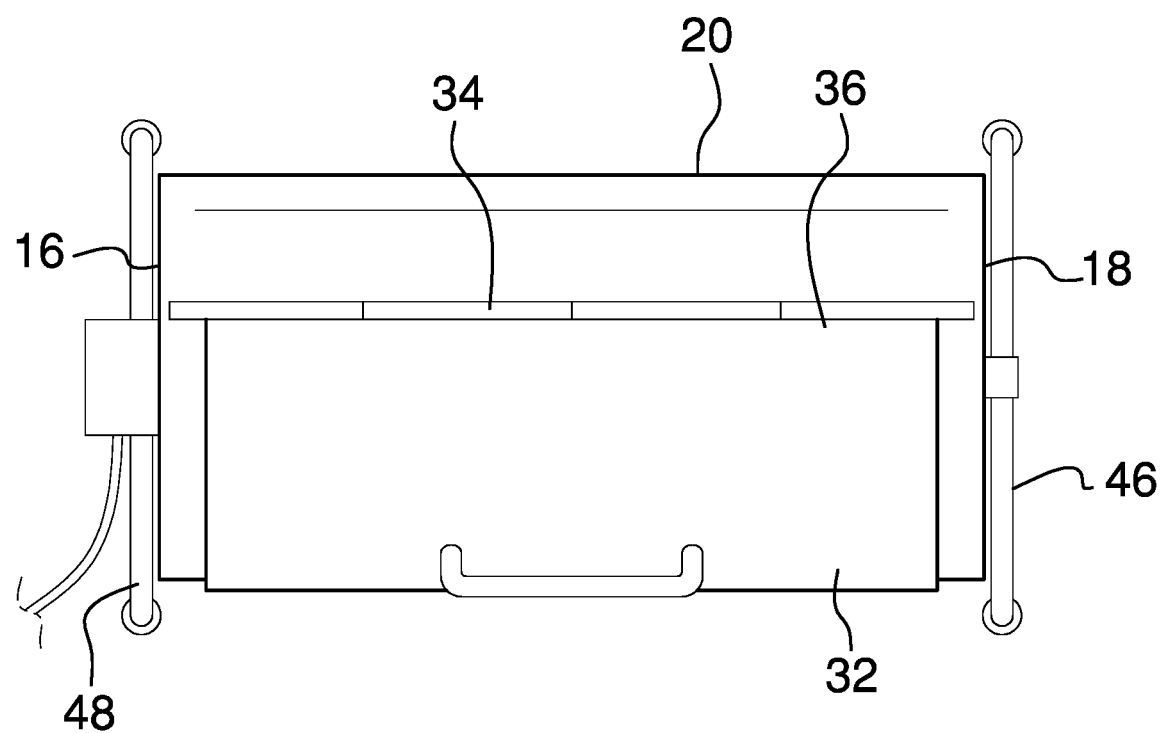
FIG. 5 is a top plan view of an embodiment of the disclosure.

With reference now to the drawings, and in particular to FIGS. 1 through 5 thereof, a new meat seasoning device embodying the principles and concepts of an embodiment of the disclosure and generally designated by the reference numeral 10 will be described.

As best illustrated in FIGS. 1 through 5, the automatic meat seasoning apparatus 10 generally comprises a housing 12 having a right face 14, a left face 16, a front 18, a rear 20, a top 22, a bottom 24, and a cavity 26. The housing 12 may be cylindrical and may have a flat portion 28 on the front 18. The housing 12 has a housing aperture 30 extending through to the cavity 26 from the front 18 to the top 22 and from proximal the right face 18 to proximal the left face 16. A housing door 32 is swingably coupled to the housing 12 with a first hinge 34 coupled to an upper edge 36 of the housing aperture. The housing door 32 has an open position 38 and an alternate closed position 40 sealing the housing aperture 30. A handle 42 is coupled to the housing door 32 to aid a user in moving the housing door from the closed position 40 to the open position 38. A pair of supports 44 may be coupled to the housing 12. The pair of supports comprises a right support 46 coupled to the right face 14 and a left support 48 coupled to the left face 16. Each of the pair of supports 44 may have a front leg 50 and a rear leg 52.

A pair of axles 54 comprises a free axle 56 centrally coupled to the right face 14 of the housing within the cavity 26 and a drive axle 58 centrally coupled to the left face 16 of the housing within the cavity. The free axle 56 spins freely relative the housing 12. A cylindrical drum 60 is coupled to the pair of axles 54 such that the drum 60 is coaxially and rotatably coupled within the cavity 26. The drum 60 has a right wall 62, a left wall 64, a body wall 66, and an inside 68 with the right wall 62 coupled to the free axle 56 and the left wall 64 coupled to the drive axle 58. The drum 60 has a drum aperture 70 extending through the body wall 66 to the inside 68 from proximal the right wall 62 to proximal the left wall 64. The drum aperture 70 may substantially conform in size and shape to the housing aperture 30. The drum 60 has a plurality of circular seasoning apertures 72 extending through each of the right wall 62, the left wall 64, and the body wall 66. The plurality of seasoning apertures 72 is configured to allow for seasonings placed in the cavity 26 of the housing to move freely between the housing and the inside 68 of the drum. A drum door 74 is swingably coupled to the drum with a second hinge 76 coupled to an upper perimeter 78 of the drum aperture. The drum door 74 has a load position 80 and an alternate operate position 82 closing the drum aperture 70. The drum door 74 has a second plurality of seasoning apertures 84. A plurality of spikes 86 is coupled to the right wall 62 and the left wall 64 inside the drum and is configured to gouge and tenderize a piece of meat placed inside the drum. A motor 88 is coupled to the left face 16 of the housing. The motor 88 has a motor drive 90 coupled through the housing 12 to the drive axle 58 to rotate the drive axle and thus rotate the drum 60 within the housing. A control unit 90 is coupled to the housing 12 and has a plurality of controls 92. The control unit 90 is in operational communication with the motor 88 and can start and stop the drum rotation or can rotate the drum for preprogrammed intervals. A power cord 94 is coupled to the motor 88 to provide power.

In use, the user opens the housing door 32 to the open position 38 and the drum door 74 to the load position 80 and places the piece of meat within the drum. The housing 12 is filled with seasonings and spices and the drum door 74 is then moved to the operate position 82 and the housing door 32 is moved to the closed position 40. The user then selects a preprogrammed or manual setting with the plurality of controls 92 to spin the drum 60 and season the piece of meat.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An automatic meat seasoning apparatus comprising:
   a housing having a right face, a left face, a front, a rear, a top, a bottom, and a cavity, the housing having a housing aperture extending through to the cavity from the front to the top and from proximal the right face to proximal the left face;
   a housing door swingably coupled to the housing, the housing door having a first hinge coupled to an upper edge of the housing aperture, the housing door having an open position and an alternate closed position, the housing door in the closed position sealing the housing aperture;
   a handle coupled to the housing door;
   a pair of supports coupled to the housing, the pair of supports comprising a right support coupled to the right face and a left support coupled to the left face;
   a pair of axles coupled to the housing, the pair of axles comprising a free axle and a drive axle, the free axle being centrally coupled to the right face of the housing within the cavity, the drive axle being centrally coupled to the left face of the housing within the cavity;
   a cylindrical drum coupled to the pair of axles, the drum being coaxially and rotatably coupled within the cavity, the drum having a right wall, a left wall, a body wall, and an inside, the right wall being coupled to the free axle and the left wall being coupled to the drive axle, the drum having a drum aperture extending through the body wall to the inside from proximal the right wall to proximal the left wall, the drum having a plurality of circular seasoning apertures extending through each of the right wall, the left wall, and the body wall, the plurality of seasoning apertures being configured to allow for a plurality of seasonings placed in the housing to move freely between the housing and the drum;
   a drum door swingably coupled to the drum, the drum door having a second hinge coupled to an upper perimeter of the drum aperture, the drum door having a load position and an alternate operate position, the drum door in the operate position closing the drum aperture, the drum door having a second plurality of seasoning apertures;
   a plurality of spikes coupled to the drum, the plurality of spikes being coupled to each of the right wall and the left wall inside the drum, the plurality of spikes being configured to gouge and tenderize a piece of meat placed inside the drum;
   a motor coupled to the housing, the motor being coupled to the left face of the housing, the motor having a motor drive being coupled through the housing to the drive axle, the motor rotating the drive axle and thus rotating the drum within the housing; and
   a control unit coupled to the housing, the control unit having a plurality of controls, the control unit being in operational communication with the motor; and
   a power cord coupled to the motor, the power cord providing power to the motor.

2. The automatic meat seasoning apparatus of claim 1 further comprising a pair of supports coupled to the housing, the pair of supports comprising a right support coupled to the right face and a left support coupled to the left face.

3. The automatic meat seasoning apparatus of claim 1 further comprising the housing being cylindrical.

4. The automatic meat seasoning apparatus of claim 3 further comprising the cylindrical housing having a flat portion on the front, the control unit being coupled within the flat portion.

5. The automatic meat seasoning apparatus of claim 2 further comprising the each of the pair of supports comprising a front leg and a rear leg.

6. An automatic meat seasoning apparatus comprising:
 a cylindrical housing having a right face, a left face, a front, a rear, a top, a bottom, and a cavity, the housing having a housing aperture extending through to the cavity from the front to the top and from proximal the right face to proximal the left face, the housing having a flat portion on the front;
 a housing door swingably coupled to the housing, the housing door having a first hinge coupled to an upper edge of the housing aperture, the housing door having an open position and an alternate closed position, the housing door in the closed position sealing the housing aperture;
 a handle coupled to the housing door;
 a pair of supports coupled to the housing, the pair of supports comprising a right support coupled to the right face and a left support coupled to the left face, each of the pair of supports comprising a front leg and a rear leg;
 a pair of axles coupled to the housing, the pair of axles comprising a free axle and a drive axle, the free axle being centrally coupled to the right face of the housing within the cavity, the drive axle being centrally coupled to the left face of the housing within the cavity;
 a cylindrical drum coupled to the pair of axles, the drum being coaxially and rotatably coupled within the cavity, the drum having a right wall, a left wall, a body wall, and an inside, the right wall being coupled to the free axle and the left wall being coupled to the drive axle, the drum having a drum aperture extending through the body wall to the inside from proximal the right wall to proximal the left wall, the drum having a plurality of circular seasoning apertures extending through each of the right wall, the left wall, and the body wall;
 a drum door swingably coupled to the drum, the drum door having a second hinge coupled to an upper perimeter of the drum aperture, the drum door having a load position and an alternate operate position, the drum door in the operate position closing the drum aperture, the drum door having a second plurality of seasoning apertures;
 a plurality of spikes coupled to the drum, the plurality of spikes being coupled to each of the right wall and the left wall inside the drum, the plurality of spikes being configured to gouge and tenderize a piece of meat placed inside the drum;
 a motor coupled to the housing, the motor being coupled to the left face of the housing, the motor having a motor drive being coupled through the housing to the drive axle, the motor rotating the drive axle and thus rotating the drum within the housing; and
 a control unit coupled to the housing, the control unit being coupled within the flat portion of the housing; the control unit having a plurality of controls, the control unit being in operational communication with the motor; and
 a power cord coupled to the motor, the power cord providing power to the motor.

\* \* \* \* \*